July 4, 1933.    L. KREAMER    1,916,622
BRAKE TESTER
Filed April 21, 1931
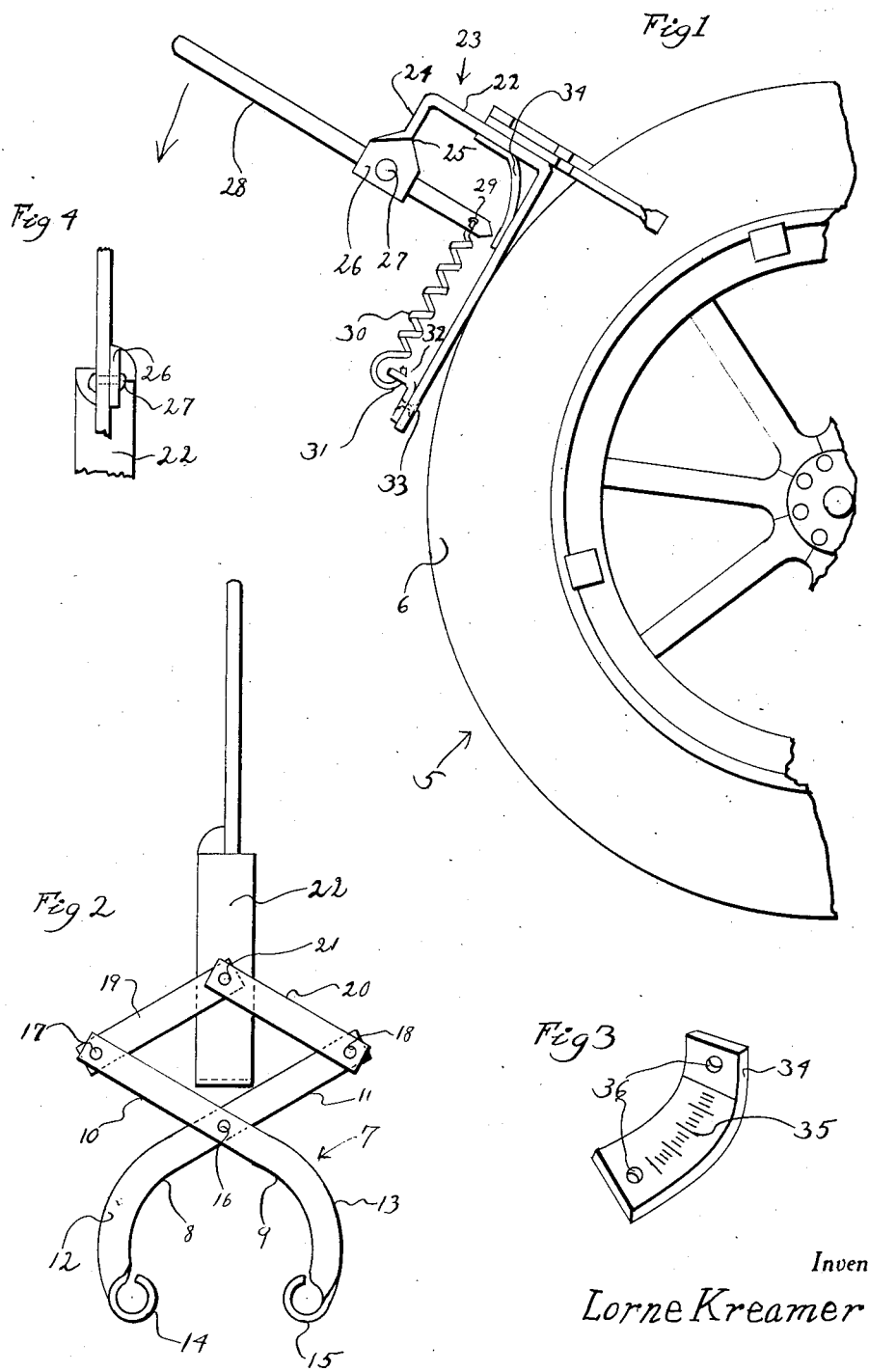
Inventor
*Lorne Kreamer*
By *Clarence A. O'Brien*
Attorney Patented July 4, 1933 1,916,622

UNITED STATES PATENT OFFICE

LORNE KREAMER, OF TONAWANDA, NEW YORK

BRAKE TESTER

Application filed April 21, 1931. Serial No. 531,817.

This invention relates generally to devices for testing brakes of motor vehicles and the like to facilitate the proper equalization of the said brakes.

It is an object of this invention to provide an efficient device of this character which is very inexpensive to manufacture, which is highly efficient and practical and which is simple and easy to operate.

These and other objects of the invention, its nature, and its composition and arrangement and combination of parts will be readily understood by any one acquainted with the art to which this invention relates upon consulting the following description of the drawing, in which:—

Figure 1 is a side elevation of a portion of an automobile wheel showing the manner of using my brake tester in association therewith.

Figure 2 is a front elevational view of the device.

Figure 3 is a perspective view of the indicating scale.

Figure 4 is a fragmentary elevational view of the mounting of the lever of the device.

Referring in detail to the drawing, the numeral 5 designates generally an automobile wheel carrying the tire 6. Disposed to straddle the tire and grip the sides thereof is a pair of tongs generally designated 7 comprising the levers 8 and 9 which comprise straight portions 10 and 11 and arcuate inwardly directed portions 12 and 13 on the lower ends of which are formed eyes 14 and 15. Should the tongs be made of band or scrap iron or the like, the eyes may be conveniently formed by twisting the lower end portion of the levers at right angles thereto and turning up the ends to form the eyes 14 and 15 which are disposed to engage the sides of the tire. The tong levers are crossed and pivoted together at 16 and they have at their upper ends pivots 17 and 18 which pivotally secure the tongs to a pair of links 19, 20, which have their upper ends pivoted together at 21 to the foot portion 22 of an L-shaped body or support 23. On the upper end of the foot portion of the L-shaped body there is a projection 24 parallel to the long side of the L-shaped body which in the case of forming the said L-shaped body out of band or scrap iron, will have a portion twisted at right angles at 25 to provide the bearing 26 carrying the pivot 27. To one side of the bearing 26 and swingably mounted on the pivot 27 is a lever 28. To the lower end of the lever 28 at 29 is secured one end of a coiled spring 30 the other end of which is secured at 31 in an ear 32 secured to the far end of the long side of the L-shaped body at 33.

The numeral 34 refers to the indicating scale carrying the indicia 35 adapted to be cooperated with by the lower end of the lever 28 in a manner to be described. The scale 34 is an arcuate flat plate adapted to fit in the angle between the long side of the L-shaped body and the foot portion thereof as illustrated in Figure 1, and it is secured in this position by means of bolts or rivets through holes 36 in the end portions of the scale.

The operation of the device is as follows.

The tongs are placed so that they embrace the tire of the wheel and the long side of the L-shaped body rests upon the tire tread in an inclined position as shown in Figure 1. The brakes for that wheel are then set to the desired gripping force by manually setting the brake pedals or levers, and the operation of measuring the brake gripping force is begun by drawing upon the lever 28 in the direction of the arrow until the wheel begins to turn. The amount of force necessary to move the wheel while the brake is set and the measure of the braking power will be indicated by the point on the scale which the lower end of the lever reaches before the wheel begins to turn. In order to test the other wheels of the vehicle, the device is removed from the first wheel and placed upon the next wheel in a similar position, and force is exerted manually upon the lever 28, and the amount of adjustment to the brakes required for each wheel will be indicated by the divergence which the lower end of the lever 28 indicates as existing between the forces necessary to turn the wheels, this information being immediately visually available on the scale 34, so that the mechanic may adjust all of the brakes so that an equal movement of the lever 28, or in other words, an equal or nearly the same positioning of the pointer on the lower end of the lever 28 will indicate that the brakes have been equalized on all of the wheels of the vehicle.

It is to be definitely understood that I do not desire to limit the application of this invention to the particular modification set out herein to illustrate the principles thereof, and any change or changes may be made in material, structure or arrangement of parts consistent with the spirit and scope of the invention.

What is claimed as new is:—

1. A vehicle wheel brake tester of the type described, comprising, a support engageable with the tire of the wheel, a pair of crossed and pivoted gripping arms having portions engageable under the belly of the sides of tire pivotally connected links connecting the radially outward portions of the arms pivotally to the support, a lever pivoted intermediate its ends on said support, a spring connected to the inward end of the lever and to the support for resisting pivotal movement of the lever in one direction, and a curved plate having indicia thereon mounted on the support, said lever being formed with a pointer at its inward end which co-operates with the indicia to indicate the force applied to rotate the wheel.

2. A brake tester for a vehicle wheel comprising a generally J-shaped body adapted to rest its standard portion on the tire of the wheel, a lever pivoted intermediate its ends on the terminal of the foot portion of the body, a curved indicator plate disposed at the juncture of the standard and foot portions of the body in cooperative relation to the inward end of the lever, a tension spring connected between the inward end of the lever and the standard portion of the body, and tong means carried by the foot portion of the body for gripping the wheel when force is applied to the lever in one direction.

3. A brake tester for a vehicle wheel comprising a generally J-shaped body adapted to rest its standard portion on the tire of the wheel, a lever pivoted intermediate its ends on the terminal of the foot portion of the body, a curved indicator plate disposed at the juncture of the standard and foot portions of the body in cooperative relation to the inward end of the lever, a tension spring connected between the inward end of the lever and the standard of the body, and tong means carried by the foot portion of the body for gripping the wheel when force is applied to the lever in one direction, said tong means comprising a pair of crossed and pivoted bars having oppositely and inwardly deflected wheel gripping end portions, a pair of links crossed and pivoted for transverse movement on the foot portion of the body, said links being pivotally connected to the remaining ends of the tong bars.

In testimony whereof I affix my signature.

LORNE KREAMER.